Oct. 13, 1970          A. GROEZINGER                    3,534,204
                  ALTERNATING CURRENT GENERATOR
Filed Oct. 2, 1968                                  4 Sheets-Sheet 1

INVENTOR:
Alfred GRÖZINGER

BY
his ATTORNEY

Oct. 13, 1970

A. GROEZINGER 3,534,204

ALTERNATING CURRENT GENERATOR

Filed Oct. 3, 1968

INVENTOR:
Alfred GRÖZINGER

INVENTOR:
Alfred GRÖZINGER

Oct. 13, 1970  A. GROEZINGER  3,534,204
ALTERNATING CURRENT GENERATOR
Filed Oct. 2, 1968  4 Sheets-Sheet 4

INVENTOR:
Alfred GRÖZINGER

BY
his ATTORNEY

United States Patent Office 3,534,204
Patented Oct. 13, 1970

3,534,204
ALTERNATING CURRENT GENERATOR
Alfred Groezinger, Stuttgart-Degerloch, Germany, assignor to Robert Bosch G.m.b.H., Stuttgart, Germany
Filed Oct. 2, 1968, Ser. No. 764,497
Claims priority, application Germany, Aug. 13, 1967, 1,613,576
Int. Cl. H02k 17/42
U.S. Cl. 310—168
21 Claims

ABSTRACT OF THE DISCLOSURE

An alternating current generator has a rotor with axially spaced pole wheels of opposite polarity provided with sets of north and south pole pieces which are circumferentially staggered. The pole wheels are located on opposite sides of an annular armature so that a flux flows from each north pole piece to one or the other of two correlated south pole pieces through projecting armature pieces and portions of the annular armature which carry windings in which alternating current is generated by cyclically reversed circumferential fluxes in the armature portions.

BACKGROUND OF THE INVENTION

The present invention relates to alternating current generators of the type in which two axially spaced pole wheels of opposite magnetic polarity, respectively, have the same number of circumferentially spaced peripheral pole pieces which are magnetically connected by a stationary armature yoke which carries armature windings. In order to eliminate slide rings, an annular field winding is mounted on the stator for magnetizing the pole wheels.

In accordance with the prior art, the pole pieces and the armature are arranged and constructed so that the magnetic flux produced by the magnetized pole pieces flows through the armature iron as a pulsating flux in the same direction. Consequently, the magnetic capacity of the armature iron is only half used.

SUMMARY OF THE INVENTION

It is one object of the invention to overcome this disadvantage of known generators of this type, and to provide a generator with an armature whose magnetic capacity is fully used.

Another object of the invention is to provide a generator which produces an alternating current of higher voltage for the same input power due to a better magnetic utilization of the magnetizable parts of the machine.

Another object of the invention is to produce a cyclically reversed magnetic flux in circumferential portions of an annular armature on which armature windings are mounted.

With these objects in view, the present invention provides a generator in which the pole pieces are disposed in accordance with the shape and construction of the armature iron so that the magnetic flux produced by the pole pieces in armature portions supporting armature windings, cyclically and continuously changes its direction during the rotation of the pole wheels.

An embodiment of the invention comprises supporting means, a rotor mounted on the supporting means for rotation about an axis and including first and second axially spaced pole means having sets of circumferentially spaced first and second pole pieces, respectively, field winding means for producing north polarity in the first pole pieces and south polarity in the second pole pieces and being preferably stationarily located between the pole means surrounding a central portion of the rotor, and a stator mounted on the supporting means, preferably supporting the field winding means, and including an annular armature means for magnetically connecting circumferentially spaced first and second pole pieces, and armature windings on circumferential armature portions which are disposed and spaced in a particular relation to the position and spacing of the first and second pole pieces.

The arrangement is such that the magnetic flux between first and second pole pieces flows during rotation of the rotor through the armature portions in cyclically or alternately reversed circumferential directions whereby an alternating current is generated in the armature windings.

In the preferred embodiment of the invention, the armature portions are the cores of the armature windings which surround the armature portions and have substantially circumferentially extending axes.

Compared hereto, in known generators of this type, the axes of the stator armature windings are parallel to the axis of rotation of the rotor having the pole wheels.

In a preferred embodiment of the invention, the pole means are axially spaced pole wheels having peripheral radially projecting circumferentially spaced first and second pole pieces, respectively, and the first and second pole pieces, respectively, are circumferentially spaced the same distance, but staggered and offset in circumferential direction half the distance between adjacent first pole pieces or second pole pieces. The distance between first or second pole pieces is at least twice the circumferential spacing of the armature windings. This arrangement results in a pulsating magnetic unidirectional magnetic flux from the pole pieces into the portions of the armature located between two armature windings, while an alternating magnetic flux flows through the armature portions surrounded by the respective armature windings.

The armature core portions surrounded by windings preferably have a smaller cross section than the intermediate armature portions which form gaps with the first and second pole pieces.

In another embodiment, the distance between adjacent first or second pole pieces may be six times the circumferential spacing of the armature winding and respective armature core portions whereby a polyphase current is generated in the armature windings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
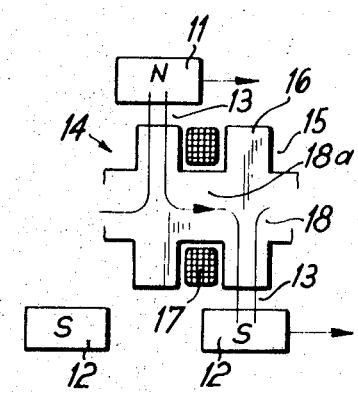
FIG. 1a and FIG. 1b are developed schematic views illustrating the relative position between pole pieces and an armature winding in two operational positions of an alternating current generator.
Figure 1B:
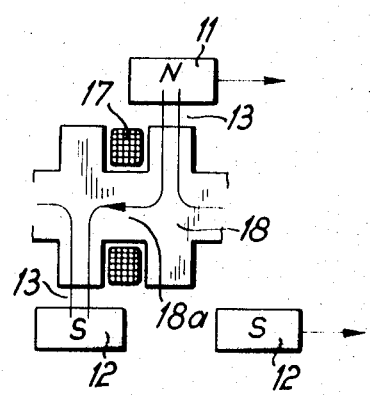

Referring first to FIGS. 1a and 1b, pole pieces 11 and pole pieces 12 are part of a rotor and move in the circumferential direction indicated by arrows. Pole pieces 11 have north polarity, and pole pieces 12 have south polarity so that a magnetic flux flows through an armature means 14, constructed as a stator, and including an annular armature yokes 18, and axially projecting therefrom armature pieces 16 which form between each other armature core portions 18a about which armature windings 17 are wound. The armature pieces 16 form air gaps 13 with pole pieces 11 and 12. In the embodiment of FIGS. 1a and 1b, the circumferential spacing between pole pieces 12 and pole pieces 11, respectively, is the same, and this pitch distance is twice the spacing between windings 17 and armature pieces 16. The axes of windings 17, of which only one is shown in FIGS. 1a and 1b, extend in circumferential direction and coincide with the axes of armature core portions 18a.

FIGS. 1a and 1b show two relative positions between the stator 14 and the pole pieces of the rotor, and while in FIG. 1b the stator 14 appears to be displaced, actually the pole pieces 11 and 12 are displaced during rotation of the rotor relative to the stator 14.

In the position of FIG. 1a, the magnetic flux flows from pole piece 11 in axial direction into the adjacent armature piece 16, in circumferential direction through the armature core portion 18a, and again in axial direction through the armature piece 16 into a pole piece 12 on the right as viewed in the drawing.

In the following position shown in FIG. 1b, a different path is formed for the flux so that the direction of the flux in the armature core portion 18a is reversed at substantially 180 degrees so that the flux flows in the opposite circumferential direction as compared with the position of FIG. 1a, resulting in the generation of a positive current pulse in winding 17, assuming that a negative current pulse was produced in the position of FIG. 1a.

While the armature pieces 16 are permeated by a pulsating unidirectional flux, the armature core portions 18a are permeated by magnetic flux whose circumferential direction is reversed every time a pair of pole pieces 11, 12 passes a pair of armature pieces 16.

Figure 1C:
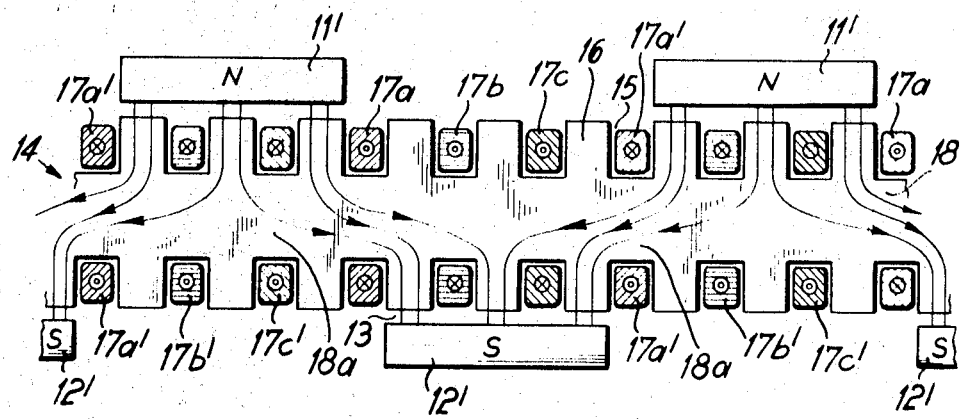
FIG. 1c is a developed schematic view illustrating the relative position between pole pieces and armature windings for generating a three phase current.

In the arrangement of FIG. 1c, pole pieces 11' and pole pieces 12' are spaced the same circumferential distance which is six times the circumferential spacing between adjacent windings 17a, 17b, 17c, 17a', 17b', 17c'. Since the arrangement is used for producing a three-phase current in the armature windings, each pole piece 11' or 12' has a circumferential extension corresponding to three windings, or three armature pieces 16.

Windings 17a, 17a' are the windings of the first phase, windings 17b, 17b' are the windings of the second phase, and windings 17c, 17c' are the windings of the third phase. Windings 17a', 17b', 17c' are wound in the opposite winding direction than windings 17a, 17b, 17c. As in the arrangement of FIGS. 1a and 1b, the magnetic flux from the pole pieces 11' flows in axial direction into the armature pieces 16 on one side of the armature means 18, and out of the armature pieces 16 on the other side of the armature means 18. The flux flows in substantially circumferential direction through the armature core portions 18a, and is reversed when a group of three windings and armature pieces 16 passes a pair of pole pieces 11', 12'.

Figure 2:
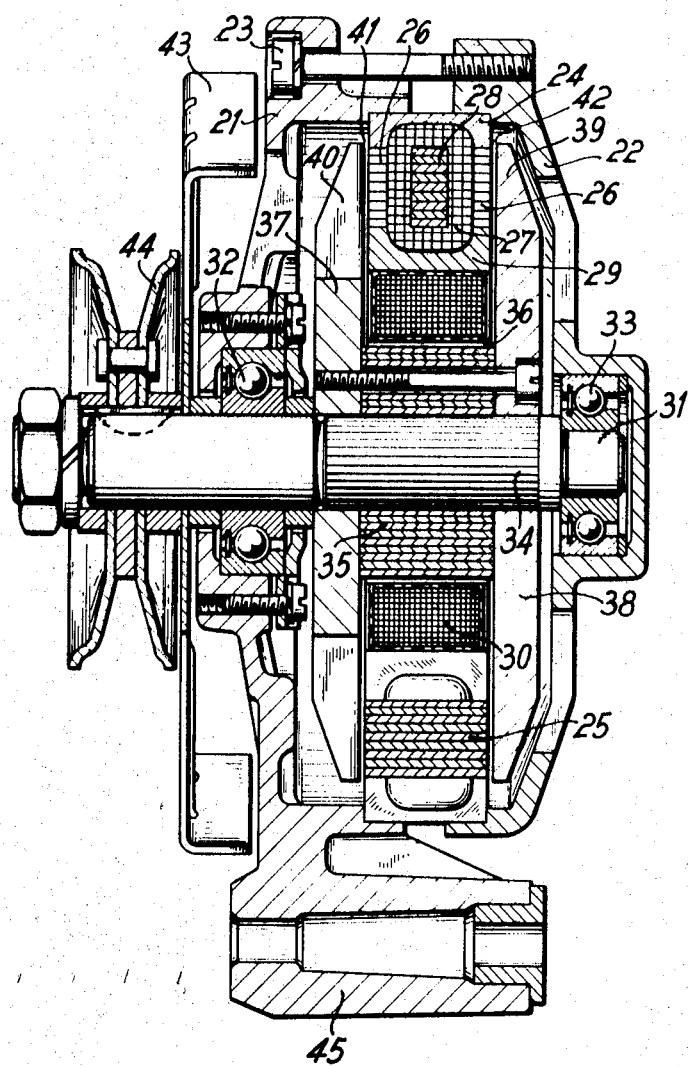
FIG. 2 is an axial sectional view illustrating a first embodiment of the invention.
Figure 3:
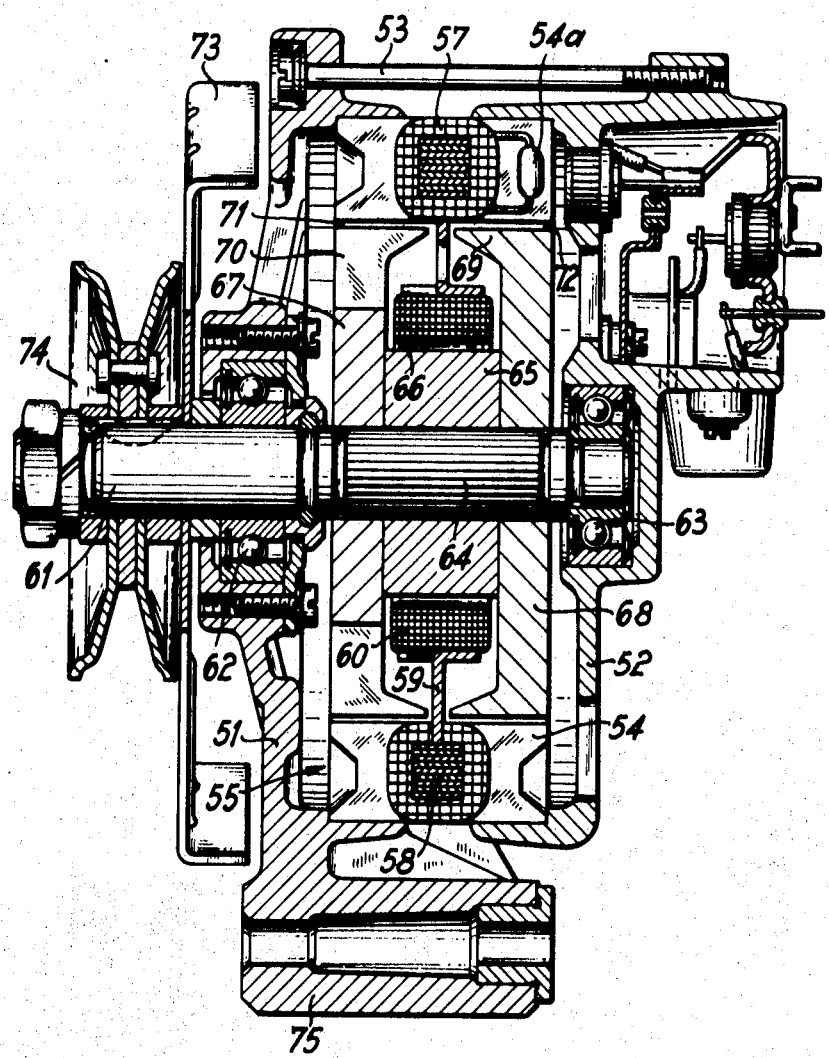
FIG. 3 is an axial sectional view illustrating a second embodiment of the invention.

FIGS. 2 and 3 illustrate structurally different embodiments of the invention, each of which can be constructed in accordance with FIGS. 1a, 1b, or with FIG. 1c which differ by the circumferential length and spacing of the pole pieces and windings, which are not apparent in the axial sectional views of FIGS. 2 and 3.

Referring first to the embodiment of FIG. 2, a supporting housing is formed by two housing shells 21 and 22 secured to each other by bolts 23. The housing shell 21 is connected with a supporting sleeve 45 adapted to receive a pivot so that the housing can be turned for tensioning a drive belt passing over a pulley 44 which is secured to a rotor shaft 31 mounted in bearings 32 and 33 of the housing. Rotor shaft 31 also carries a cooling fan blade 43. The central part 34 of rotor shaft 31 is roughened by longitudinal grooves and carries fixed thereon an annular yoke 35 consisting of a spirally wound magnetizable iron band. A pair of pole means, shown to be pole wheels 37 and 38 are secured by bolts to the end faces of the annular yoke 35 and connected with rotor shaft 31 for rotation. The first and second pole wheels 37 and 38 have, respectively, first and second peripheral teeth or pole pieces 39, separated by cutouts 40. As explained with reference to FIGS. 1a, 1b and 1c, the first and second pole pieces 39 are uniformly spaced the same distance and are offset relative to each other in circumferential direction so that each pole piece 39 is located opposite a cutout 40.

Pole wheels 37 and 38 have confronting inner faces located in planes perpendicular to the axis of rotor shaft 31 and forming air gaps 41 and 42 with lateral faces of an annular stator 25 whose periphery is formed by non-magnetizable intermediate bodies 24 clamped between housing shells 21 and 22 whereby the stator 25 is stationarily supported. The annular stator armature 25 is formed by a spirally wound magnetizable band consisting of iron and having opposite lateral annular faces provided with radial grooves 26. Between each pair of grooves 26, an axially arrow armature core portion remains about which armature windings 27, partly located in grooves 26, are wound.

Within the inner periphery of the annular armature means 25, non-magnetizable intermediate bodies 29 are mounted for supporting an annular field winding 30 which surrounds the rotor yoke portion 35 spaced a small circular air gap from the same so that rotors 31, 34, 35, 37, 38 can freely rotate, while the pole wheels 37 and 38 are magnetized in opposite polarities, together with their respective first and second pole pieces 39 so that a magnetic flux, for example as described with reference to FIGS. 1a and 1b, is generated between pairs of first and second pole pieces 39 having opposite polarities so that the magnetic flux flows in circumferential direction through the armature core portions 28.

During operaiton, field winding 30 is excited by a direct current so that the radially projecting peripheral pole pieces 39 of pole wheel 37 become north poles, and pole pieces 39 of pole wheel 38 become south poles. Assuming the same spacing of the windings 27 as shown for the windings 17 in FIG. 1a, and a corresponding twice as large distance between offset pole pieces 39 of pole wheels 37 and 38, the circumferential flux in the armature core portions 28 is reversed whenever a pole pice 39 passes a winding 27. An alternating magnetic flux flows in each armature core portion 28 so that the entire annular armature 25 is utilized and a higher voltage is induced in the armature windings 27 than could be obtained by a pulsating unidirectional magnetic flux according to the prior art.

In the embodiment of FIG. 2, the magnetic flux flows in substantial axial directions from the pole pieces 39 in the intermediate full portions of armature 25, as best seen in the lower part of FIG. 2. In the embodiment of FIG. 3, the magnetic flux from the pole pieces flows in radial direction into and out of the armature.

The generator illustrated in FIG. 3 has two housing shells 51 and 52 secured to each other by bolts 53. Bearings 62 and 63 on housing shells 51 and 52 support a rotor shaft 61 which carries a drive pulley 74 and a cooling fan blade 73. The central shaft portion 64 carries two fixed pole means shown to be pole wheels 67 and 68, and between the same, an annular and cylindrical yoke 65 which is separated by a circular air gap 66 from a stationary circular field winding 60 which is supported by the armature means 55 of the stator. An annular armature 58 is formed of a spirally wound iron band which is surrounded by circumferentially spaced armature windings 57 whose axes extend in circumferential directions. Magnetizable armature pieces 54 are located between windings 57 and are clamped between annular shoulders of housing shells 51 and 52. Holding means 59 consisting of a non-magnetizable material, is secured to the annular armature 58 and supports the annular field winding 60 which forms an annuilar air gap 66 with the magnetizable central rotor portion 65. Armature 58, windings 57, armature pieces 54, holding means 59, and field winding 60 form a stator unit which is impregnated with a lacquer.

Armature pieces 54 project in opposite axial directions from the annular armature 58. The armature means 55, and more particularly the radially inner faces of the armature pieces 54, surround the peripheral end faces of the pole pieces 69 of pole wheels 67 and 68. Pole pieces 69 are separated by cutouts 70, and the pole pieces 69 of the two pole wheels 67 and 68 are offset and staggered to each other in circumferential direction. The peripheral end faces of pole pieces 69 are separated by air gaps 71 and 72 from the armature pieces 54 to permit free rotation of the pole wheels 67, 68 of the rotor with rotor shaft 61. As in the embodiment of FIG. 2, the pole pieces 69 project outwardly in radial direction, but in the embodiment of FIG. 3, the end portions of pole pieces 69 project toward each other, forming a gap in which the web of holding means 59 is located. As in the arrangement of FIG. 1a, the circumferential spacing of pole pieces 69 of each pole wheel may be twice the circumferential spacing of armature windings 57, or of armature pieces 54.

During operation, the stationary field winding 60 is excited by direct current so that the pole pieces 69 of pole wheel 67 becomes north poles, and pole pieces 69 of pole wheel 68 become south poles. The flux from the north pole enters in radial direction the respective pole piece 54, flows then in axial direction into a portion of annular core 58 on which armature pieces 54 abut, and then in circumferential direction through the armature core portion surrounded by a winding. The flux then flows in axial direction into the respective pole piece 54, and then in radial direction out of the same into the following pole piece 69 of the respective other pole wheel. When an armature piece 54 is passed by the next pole piece 69, the circumferential direction of the magnetic flux in the armature core portion surrounded by winding 57 is reversed so that an alternating current is generated in armature windings 57.

In both embodiments of the invention, an annular or circular armature is provided into which the magnetic flux enters between adjacent armature windings, and then flows in circumferential direction through an armature core portion surrounded by an armature winding. In the embodiment of FIG. 2, grooves 26 are provided in the annular armature 25 for receiving the windings, and in the embodiment of FIG. 3, projecting armature pieces 54 are provided between the windings. Armature pieces can also be provided in the embodiment of FIG. 2 so that it is not necessary to form the grooves in armature 25.

Figure 4:
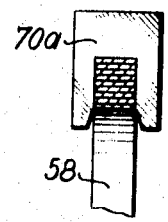
FIGS. 4, 5 and 6 are fragmentary axial sectional views illustrating modifications of the armature in the embodiment of FIG. 2.
Figure 5:
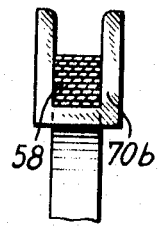
Figure 6:
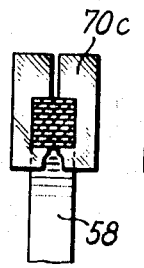

Different modified constructions of armature pieces are shown in FIGS. 4 to 11. The constructions of FIGS. 4, 5 and 6 are suitable for machines of the type shown in FIG. 2 in which lateral surfaces of pole pieces 39 from gaps 41 with lateral faces of the armature. In the constructions of FIGS. 4 and 5, an annular armature 58 of constant axial width has U-shaped armature pieces 70a attached thereto at circumferentially spaced intervals, and the armature windings, not shown, are located between the armature pieces 70a, or 70b. In the embodiment of FIG. 6, each armature piece consists of a pair of symmetrically arranged parts 70c.

Figure 7:
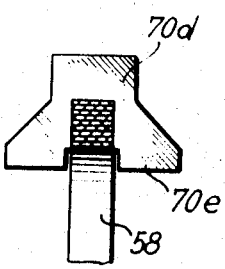
FIG. 7 is a fragmentary axial section illustrating a modification of the armature in the embodiment of FIG. 3.

The construction of FIG. 7 is suitable for the embodiment of FIG. 3 since the integral armature piece 70d has inner faces 70e which are placed opposite the peripheral end faces of pole pieces 69 to form gaps 71, 72 with the same.

Figure 8:
FIGS. 8, 9 and 10 are fragmentary elevations illustrating modified armature constructions.

FIG. 8 shows two circumferentially spaced pole pieces 71a formed as integral bodies having a trapezoidal cross section, to form rectangular spaces in which the armature windings will be located.

Figure 9:
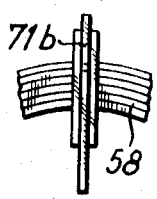

In the construction of FIG. 9, the pole piece 71b is not an integral body, but comprises several sheets attached to each other. The central sheet projects beyond the outer sheets and forms a cooling fin which may also be used for supporting the field winding 30 or 60.

Figure 10:
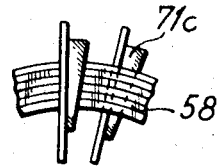
Figure 11:
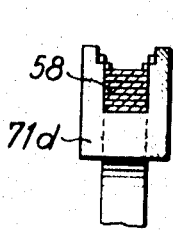
FIGS. 11, 12, 13 and 14 are fragmentary axial sections illustrating modified armature constructions.
Figures 12, 13:
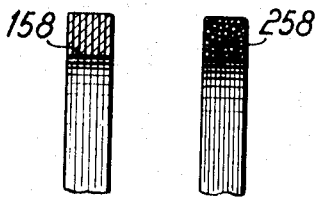
Figure 14:
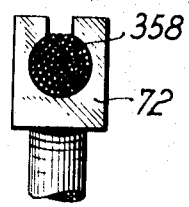

In the construction of FIG. 10, each armature piece 71c includes a solid portion and a thin portion for supporting the field winding. The upper portions of the thin sheets in the constructions of FIGS. 9 and 10 may be clamped between the two housing shells. The sheets in FIG. 9 have rectangular cross sections, while parts of the armature pieces 71c have a trapezoidal cross section. The armature pieces may be adhesively attached, soldered, welded, or clamped to the armature 58 as shown for the U-shaped armature piece 71d in FIG. 11. In the construction of FIG. 12, the armature 158 is wound of a magnetizable iron band in such a manner that adjacent windings or loops of the band are located in planes perpendicular to the axis of the armature 158. In the construction of FIG. 13, the armature 258 is wound of a magnetizable wire whose windings are adhesively attached to each other. In the construction of FIG. 14, the armature 358 consists of magnetizable wire directly wound into circular cutouts in a plurality of armature pieces 72.

The cross section of the annular armature can be rectangular, square, square with rounded off corners, circular or elliptic so that the respective armature winding between two armature pieces has the smallest possible winding length.

It is advantageous to provide cavities in the armature pieces, as shown in FIG. 3 in which connections to the windings are placed, or in which diodes 54a for rectifying the current supplies to the field winding are located. The annular armature means is preferably covered with a suitable synthetic resin lacquer before the windings are placed thereon.

The pole wheels can be constructed as solid pieces, or as laminated bodies. The rotor yoke can be constructed as a ring-shaped solid magnetizable body, as shown at 65 in FIG. 3, or be laminated and wound of an iron band, as shown at 35 in FIG. 2.

It will be understood that each of the elements described above, or two or more together, may also find a useful application in other types of alternating current generators differing from the types described above.

While the invention has been illustrated and described as embodied in an alternating current generator whose annular armature is permeated by a magnetic flux flowing alternately in opposite circumferential directions, it is not intended to be limited to the details shown, since various modifications and structural changes may be made without departing in any way from the spirit of the present invention.

What is claimed as new and desired to be protected by Letters Patent is set forth in the appended claims.

I claim:

1. An alternating current generator comprising, in combination, supporting means; a rotor mounted on said supporting means for rotation about an axis and including first and second axially spaced pole means having sets of circumferentially spaced first and second pole pieces, respectively, said first pole pieces and said second pole pieces being spaced the same distance in circumferential direction, and circumferentially staggered relative to each other half said distance so that each first pole piece is aligned in axial direction with the space between two adjacent correlated second pole pieces; field winding means for producing north polarity in said first pole pieces and south polarity in said second pole pieces; and a stator mounted on said supporting means and including an annular armature means for magnetically connecting circumferentially spaced first and second pole pieces so that during rotation of said rotor an unidirectional magnetic flux flows from each first pole piece through said armature means to one of the respective correlated two second pole pieces, said armature means having circumferential armature portions disposed and spaced so that the magnetic flux between correlated first and second pole pieces flows during rotation of said rotor through said armature portions in circumferential directions which are cyclically reversed substantially 180 degrees when the magnetic flux flowing in each of said armature portions shifts from one of said two correlated adjacent second pole pieces to the respective other correlated second pole pieces, and a plurality of armature windings on said armature portions, respectively, whereby the cyclically reversed magnetic fluxes generate an alternating current in said armature windings.

2. A generator as claimed in claim 1 wherein said armature means includes three armature portions, said distance is six times the circumferential spacing between adjacent armature windings; wherein each of said first and second pole pieces has a circumferential length which is half said distance so that each of said pole pieces provides flux for said three armature portions and for three armature windings; and wherein the three armature windings associated with one first pole pieces are wound in opposite direction to the three armature windings associated with one second pole piece whereby a three-phase current is generated in said armature windings.

3. A generator as claimed in claim 1 wherein said rotor includes a shaft and a magnetizable central rotor portion; wherein said first and second pole means are axially spaced first and second pole wheels secured to said shaft abutting said central rotor portion and having said first and second pole pieces on the peripheries thereof, respectively; and wherein said field winding means is mounted on said stator and surrounds said central rotor portion forming an airgap with the same.

4. A generator as claimed in claim 1 wherein said annular armature means includes a circular armature of constant cross section, and circumferentially spaced magnetizable armature pieces on said circular armature abutting the same and having first and second lateral faces forming gaps with the inner lateral faces of said first and second pole pieces, respectively, so that the magnetic flux between first and second pole pieces enters and leaves the armature means in axial direction and flows in said armature portions in circumferential direction; and wherein said armature windings are loacted between said armature pieces and surround said circular armature.

5. A generator as claimed in claim 1 wherein said armature windings surround said armature portions and have axes extending substantially in circumferential directions so that said armature portion are cores of said armature windings.

6. A generator as claimed in claim 1 wherein said distance is at least twice the circumferential spacing between adjacent armature windings.

7. A generator as claimed in claim 3 wherein said annular armature means surrounds said pole wheels; and wheein said pole pieces have peripheral end faces forming gaps with said armature means so that the magnetic flux between first and second pole pieces enters and leaves said armature means in radial directions and flows in said armature portions in circumferential direction.

8. A generator as claimed in claim 7 wherein said armature means includes a circular armature of constant cross section, and circumferentially spaced magnetizable armature piece means on said armature abutting the same and having radially inner faces forming said gaps with said end faces of said pole pieces during rotation of said rotor, and wherein said windings are located between said armature piece means surrounding said armature.

9. A generator as claimed in claim 1 wherein said armature means includes a circular armature, and circumferentially spaced armature pieces abutting said circular armature forming gaps with said first and second pole pieces, the portions of said armature between said armature pieces being said armature portions; and wherein said armature windings surrounding said armature portions between said armature pieces.

10. A generator as claimed in claim 8 wherein each armature piece is an integral body.

11. A generator as claimed in claim 8 wherein each armature piece includes more than one part.

12. A generator as claimed in claim 8 wherein said armature pieces are laminated.

13. A generator as claimed in claim 9 wherein said armature pieces include cooling fins.

14. A generator as claimed in claim 9 wherein each armature piece has a trapezoid cross section in a plane transverse to said axis.

15. A generator as claimed in claim 9 wherein each armature piece has a rectangular cross section in a plane transverse to said axis.

16. A generator as claimed in claim 15 wherein said armature is a spirally wound magnetizable band having windings adjacent in radial direction.

17. A generator as claimed in claim 15 wherein said armature is a spirally wound magnetizable band having windings adjacent in planes perpendicular to said axis.

18. A generator as claimed in claim 1 wherein said armature means includes a circular armature wound of magnetizable wire.

19. An alternating current generator comprising, in combination, supporting means; a rotor mounted on said supporting means for rotation about an axis and including a shaft, a magnetizable central rotor portion secured to said shaft, and first and second axially spaced pole wheels secured to said shaft and abutting said central rotor portions, said pole wheels having sets of circumferentially spaced first and second pole pieces, respectively, spaced the same distance in circumferential direction and being staggered relative to each other half said distance; field winding means surrounding said central rotor portion and located between said first and second pole wheels for producing north polarity in said first pole pieces and south polarity in said second pole pieces; and a stator mounted on said supporting means and including an annular armature means for magnetically connecting circumferentially spaced first and second pole pieces, said armature means having circumferential armature portions disposed and spaced so that the magnetic flux between first and second pole pieces flows during rotation of said rotor through said armature portions in cyclically reversed circumferential directions, said annular amature means having lateral first and second faces forming gaps with the inner lateral faces of said first and second pole pieces, respectively, so that the magnetic flux between first and second pole pieces enters and leaves said armature means in axial direction and flows in said armature portions in circumferential direction, and a plurality of armature windings on said armature portions, respectively, whereby the cyclically reversed magnetic flux generates an alternating current in said armature windings.

20. A generator as claimed in claim 19 wherein said first and second lateral faces of said armature means are formed in the region of said armature portions with radially extending circumferentially spaced grooves in which said armature windings are located.

21. A generator as claimed in claim 19 wherein said annular armature means includes a circular armature of constant cross section, and circumferentially spaced magnetizable armature piece means on said circular armature abutting the same and having said first and second lateral faces; and wherein said armature windings are located between said armature piece means and surround said armature.

References Cited

UNITED STATES PATENTS

| | | | |
|---|---|---|---|
| 2,937,803 | 5/1960 | Cunningham | 310—62 |
| 239,702 | 3/1966 | Van de Graaff | 310—185 |
| 3,261,998 | 7/1966 | Bosco | 310—126 |
| 3,418,506 | 12/1968 | Parker | 310—268 |
| 3,428,840 | 2/1969 | Kober | 310—156 |
| 3,435,267 | 3/1969 | Beyersdorf | 310—168 |

MILTON O. HIRSHFIELD, Primary Examiner

R. SKUDY, Assistant Examiner

U.S. Cl. X.R.

310—62, 67, 165, 188